(12) United States Patent
Kaneko

(10) Patent No.: US 10,308,103 B2
(45) Date of Patent: Jun. 4, 2019

(54) VEHICLE

(71) Applicant: Toyota Jidosha Kabushiki Kaisha, Toyota-shi Aichi-ken (JP)

(72) Inventor: Akihiro Kaneko, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 312 days.

(21) Appl. No.: 15/175,262

(22) Filed: Jun. 7, 2016

(65) Prior Publication Data

US 2016/0363092 A1  Dec. 15, 2016

(30) Foreign Application Priority Data

Jun. 10, 2015 (JP) ................................ 2015-117400

(51) Int. Cl.
| | |
|---|---|
| *B60K 6/24* | (2007.10) |
| *F01N 3/20* | (2006.01) |
| *F02D 41/14* | (2006.01) |
| *F02D 41/38* | (2006.01) |
| *B60K 6/445* | (2007.10) |
| *B60W 10/30* | (2006.01) |
| *B60W 20/15* | (2016.01) |

(52) U.S. Cl.
CPC ............... *B60K 6/24* (2013.01); *B60K 6/445* (2013.01); *B60W 10/30* (2013.01); *B60W 20/15* (2016.01); *F01N 3/20* (2013.01); *F02D 41/1477* (2013.01); *F02D 41/3854* (2013.01); *B60W 2710/0627* (2013.01); *B60Y 2200/92* (2013.01); *F02D 2041/389* (2013.01); *F02D 2200/0602* (2013.01); *F02D 2200/1002* (2013.01); *F02D 2250/02* (2013.01); *Y02T 10/6239* (2013.01); *Y10S 903/905* (2013.01); *Y10S 903/93* (2013.01)

(58) Field of Classification Search
CPC ...... F02M 47/00; F02M 47/02; F02M 55/008; F02M 47/027; F02M 2547/008
See application file for complete search history.

(56) References Cited

U.S. PATENT DOCUMENTS

| | | | | |
|---|---|---|---|---|
| 6,044,831 | A * | 4/2000 | Takagi | ................ F02D 41/0032 123/520 |
| 6,378,501 | B1 | 4/2002 | Hisato et al. | |
| 6,408,825 | B1 * | 6/2002 | Enoki | ................... F02D 41/042 123/179.17 |
| 7,281,520 | B2 * | 10/2007 | Klenk | ..................... F02M 37/04 123/446 |
| 9,194,353 | B2 * | 11/2015 | Kojima | ............... F02D 41/0025 |

(Continued)

FOREIGN PATENT DOCUMENTS

| | | |
|---|---|---|
| EP | 1995438 A1 | 11/2008 |
| EP | 1995438 B1 | 2/2012 |

(Continued)

*Primary Examiner* — Sizo B Vilakazi
(74) *Attorney, Agent, or Firm* — Dinsmore & Shohl LLP

(57) ABSTRACT

A feed pump supplies fuel to a port injection valve of an engine through low pressure fuel piping by applying a pressure to fuel. An engine ECU controls a fuel pressure which is a pressure applied to fuel by driving the feed pump. When the feed pump is driven to lower the fuel pressure, and it is determined that vapor is generated in the fuel piping, the engine ECU executes a fuel pressure control that increases the fuel pressure provided at the time of determination.

4 Claims, 10 Drawing Sheets

(56) References Cited

U.S. PATENT DOCUMENTS

| | | | | |
|---|---|---|---|---|
| 2005/0092302 A1* | 5/2005 | Kojima | ............ | F02D 41/042 123/458 |
| 2006/0231080 A1* | 10/2006 | Tomatsuri | ............ | F02D 41/003 123/516 |
| 2007/0006849 A1* | 1/2007 | Mashiki | ............ | F02D 41/406 123/457 |
| 2007/0246025 A1* | 10/2007 | Sato | ............ | F02D 41/0045 123/520 |
| 2009/0177372 A1* | 7/2009 | Akita | ............ | F02M 59/366 701/113 |

FOREIGN PATENT DOCUMENTS

| | | |
|---|---|---|
| JP | 2001-159359 A | 6/2001 |
| JP | 2006-138295 A | 6/2006 |
| JP | 2006-250113 A | 9/2006 |

* cited by examiner

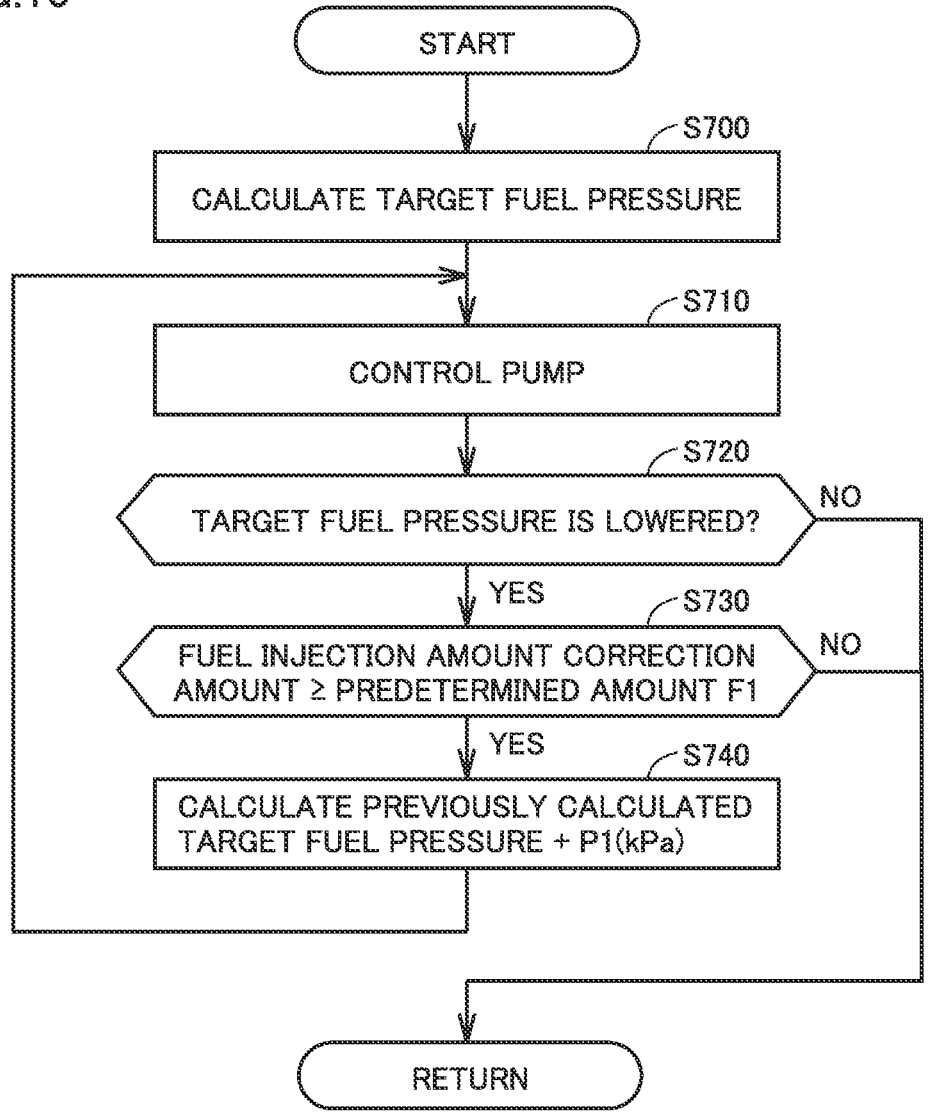

VEHICLE

CROSS-REFERENCE TO RELATED APPLICATIONS

This nonprovisional application claims priority to Japanese Patent Application No. 2015-117400 filed on Jun. 10, 2015 with the Japan Patent Office, the entire contents of which are hereby incorporated by reference.

BACKGROUND

Technical Field

The present disclosure relates to a vehicle, particularly to a vehicle including a combustion engine.

Description of the Background Art

Japanese Patent Laying-Open No. 2001-159359 discloses a fuel pressure control device of an engine. This fuel pressure control device performs a feedback control so as to control an actual fuel pressure of fuel supplied to an engine to match a target fuel pressure. This fuel pressure control device can variably set a control gain at the time of performing the feedback control. Specifically, provided are a first control gain used in the case where the fuel pressure is in a steady state and a second control gain used in the case where a change in the fuel pressure is great. The second control gain is less than the first control gain. This fuel pressure control device switches the control gain from the first control gain to the second control gain when the target fuel pressure is changed by a predetermined amount or greater.

Accordingly, overshoot and undershoot in the fuel pressure during fuel pressure transition are suppressed, and a difference between the actual fuel pressure and the target fuel pressure is converged assuredly.

In the fuel pressure control device disclosed in Japanese Patent Laying-Open No. 2001-159359, the target fuel pressure of fuel supplied to an engine is determined in accordance with an operational state of the engine. It can be contemplated that the target fuel pressure is lowered in accordance with the operational state of the engine. When the target fuel pressure is lowered, and if the temperature of the fuel is high, fuel is vaporized (generates vapor) in fuel piping. When vapor is generated in fuel piping, a quantity of fuel injected to the engine becomes insufficient as compared to a target amount.

On the other hand, if it is attempted to maintain a high target fuel pressure regardless of the operational state of the engine, it would be necessary to supply great electric power to a pump which applies a pressure to fuel. This is not preferable in view of fuel consumption.

SUMMARY

The present disclosure was made to solve such a problem, and its object is to provide a vehicle which suppresses generation of vapor and does not deteriorate fuel consumption.

A vehicle in accordance with one aspect of the present disclosure includes a combustion engine, a pump, and a control device. The pump supplies fuel to a fuel injection valve of the combustion engine through fuel piping by applying a pressure to fuel. The control device controls a fuel pressure which is a pressure applied to fuel by driving the pump. When the pump is driven to lower the fuel pressure, and it is determined that vapor is generated in the fuel piping, the control device executes a fuel pressure control that increases the fuel pressure provided at the time of determination.

In such a manner, according to this vehicle, when it is determined that vapor is generated, the fuel pressure is increased to suppress generation of vapor, so that generation of vapor can be suppressed. Moreover, when vapor is not generated, lowering of the fuel pressure can be continued. Therefore, according to this vehicle, fuel consumption of energy for driving the pump can be reduced, so that deterioration in the fuel consumption can be prevented.

In some embodiments of this vehicle, the control device increases the fuel pressure by performing a lower limit guard control that controls the fuel pressure such that the fuel pressure becomes always greater than a predetermined value.

Accordingly, in this vehicle, when it is determined that vapor is generated, the lower limit guard control that controls the fuel pressure to be always greater than the predetermined value is performed. Consequently, generation of vapor can be suppressed more assuredly.

In some embodiments of this vehicle, when an elapsed time from determination that vapor is generated exceeds a predetermined time period, the control device performs a control so as not to perform the fuel pressure control.

When a predetermined condition is once satisfied, the predetermined condition is likely to be satisfied continuously to some extent. Therefore, when the predetermined condition is once satisfied, continuous determination on whether or not the predetermined condition is satisfied is wasteful in view of a throughput of the control device. On the other hand, even when the predetermined condition is once satisfied, there is a case where the predetermined condition is not satisfied due to subsequent lowering in the temperature of fuel. In such a case, it is not determined again whether or not the predetermined condition is satisfied. Therefore, continuous execution of the fuel pressure control is wasteful in view of fuel consumption. In this vehicle, the fuel pressure control is stopped after elapse of a predetermined time period. Thus, in this vehicle, whether or not to start the fuel pressure is determined for every predetermined time period. Consequently, according to this vehicle, since the determination about whether or not the predetermined condition is satisfied is not always performed, the throughput of the control device can be reduced. Moreover, since the fuel pressure control is not permanently performed even if the predetermined condition is once satisfied, consumption of energy for driving the pump can be reduced, so that deterioration in the fuel consumption can be reduced.

In some embodiments of this vehicle, the control device executes an air-fuel ratio control for controlling an air-fuel ratio of air-fuel mixture supplied to the combustion engine to be a target value. The control device determines that vapor is generated when a correction amount by the air-fuel ratio control in a direction of lowering the air-fuel ratio is greater than or equal to a predetermined amount.

If vapor is generated in the fuel piping, there is a possibility that the injection quantity of fuel is reduced. In such a case, the air-fuel ratio becomes higher than the target value. In this vehicle, the air-fuel ratio control that controls the air-fuel ratio to be the target value is executed. When the air-fuel ratio is high, a correction in the direction of lowering the air-fuel ratio is executed. In other words, when the correction amount in the direction of lowering the air-fuel ratio is greater than or equal to a predetermined amount, it can be determined that vapor is generated. Therefore, in this vehicle, the control device executes the fuel pressure control that increases the fuel pressure in such a case described above. Accordingly, with this vehicle, generation of vapor can be suppressed when it is determined that vapor is generated. Moreover, since lowering of the fuel pressure can be continued when vapor is not generated, consumption of energy for driving the pump can be reduced, so that deterioration in fuel consumption can be prevented.

In some embodiments, this vehicle further includes an air-fuel ratio sensor. The air-fuel ratio sensor detects an air-fuel ratio of air-fuel mixture supplied to the combustion engine. The control device determines that vapor is generated when the air-fuel ratio detected by the air-fuel ratio sensor is greater than a target value of the air-fuel ratio by a predetermined amount or greater.

As described above, when vapor is generated in the fuel piping, the air-fuel ratio becomes higher than the target value by the predetermined amount or greater. Therefore, in this vehicle, the control device executes the fuel pressure control in such a case as described above. Accordingly, in this vehicle, the control device can suppress generation of vapor when it determines that vapor is generated, and can prevent deterioration in fuel consumption when vapor is not generated.

In some embodiments, the control device determines that the vapor is generated when torque actually outputted by the combustion engine is less than target torque of the combustion engine by a predetermined amount or greater.

If vapor is generated in the fuel piping, there is a possibility that an injection quantity of fuel is reduced. In such a case, actual torque outputted by the combustion engine is lowered with respect to target torque. In this vehicle, the control device executes the fuel pressure control when the actual torque is less than the target torque by a predetermined amount or greater. Accordingly, in this vehicle, the control device can suppress generation of vapor when it determines that vapor is generated, and can prevent deterioration in fuel consumption when vapor is not generated.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 10 is a flowchart representing a fuel pressure control in a low pressure fuel supply mechanism of the third embodiment.

DESCRIPTION OF THE EMBODIMENTS

Figure 1:
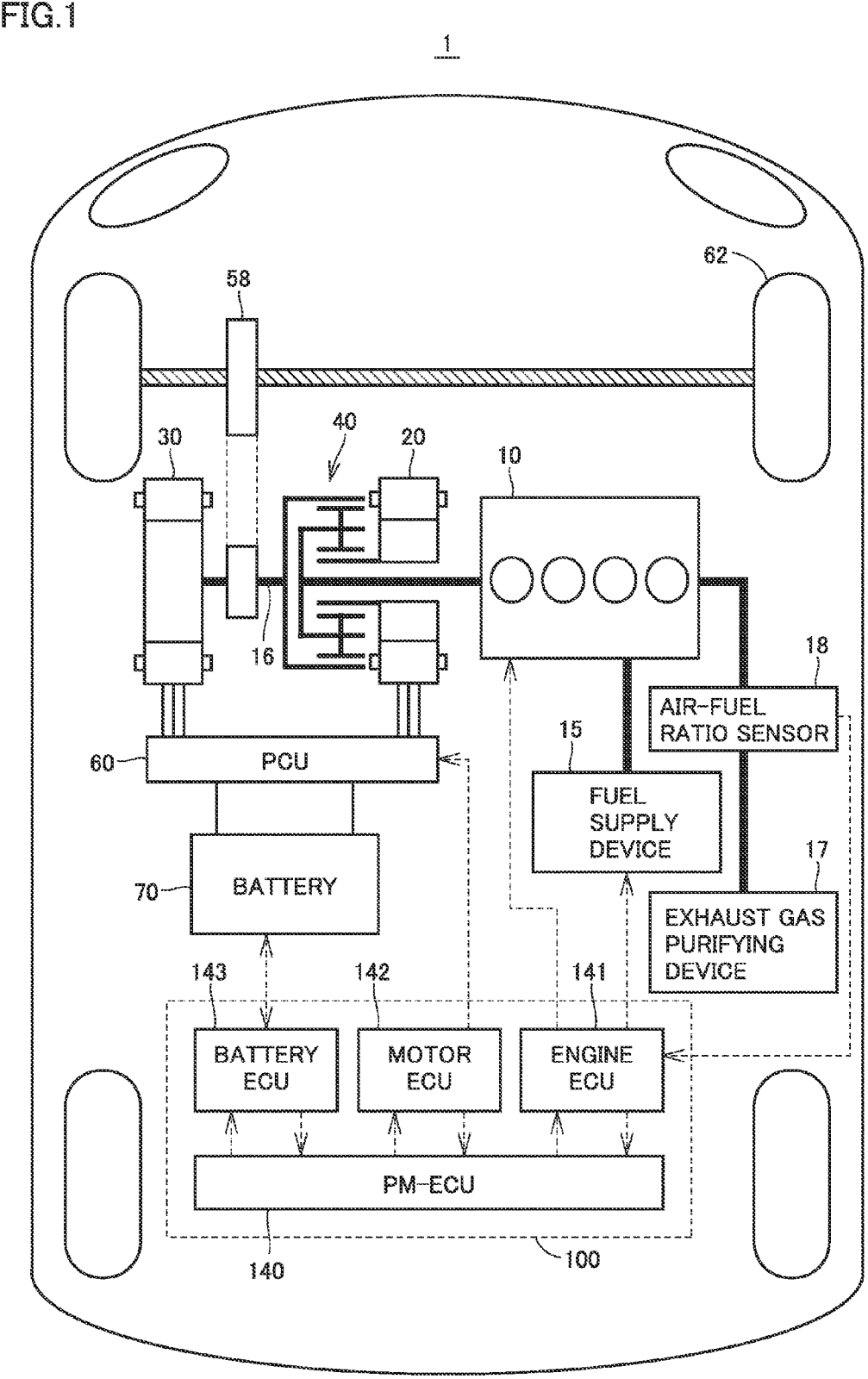
FIG. 1 is an overall block diagram representing a hybrid vehicle of the first embodiment.

Hereinafter, embodiments of the present disclosure will be described in detail with reference to the drawings. It should be noted that the same or corresponding parts in the drawings have the same reference characters allotted, and description thereof will not be repeated.

First Embodiment

Configuration of Hybrid Vehicle

FIG. 1 is an overall block diagram of a hybrid vehicle which is one example of a vehicle in accordance with this first embodiment. Referring to FIG. 1, a hybrid vehicle 1 includes an engine 10, a fuel supply device 15, an exhaust gas purifying device 17, an air-fuel ratio sensor 18, motor generators 20, 30, a power split mechanism 40, a reduction mechanism 58, driving wheels 62, a power control unit (PCU) 60, a battery 70, and a control device 100.

Hybrid vehicle 1 travels with at least one of engine 10 and motor generator 30 as a drive source. Engine 10, motor generator 20, and motor generator 30 are connected to power split mechanism 40. Reduction mechanism 58 is connected to a rotational shaft 16 of motor generator 30. Rotational shaft 16 is connected to driving wheels 62 via reduction mechanism 58 and is connected to a crankshaft of engine 10 via power split mechanism 40.

Power split mechanism 40 splits a driving force of engine 10 to motor generator 20 and rotational shaft 16. Motor generator 20 rotates the crankshaft of engine 10 via power split mechanism 40 to serve as a starter for starting engine 10. Power split mechanism 40 is constituted of, for example, a planetary gear mechanism. In this case, a rotational shaft of motor generator 20 is connected to a sun gear of the planetary gear mechanism, and the crankshaft of engine 10 is connected to a carrier, and driving wheels 62 are connected to a ring gear through rotational shaft 16 of motor generator 30 and reduction mechanism 58.

Both motor generators 20, 30 are known synchronous generator motors operating as a generator or an electric motor. Motor generators 20, 30 are connected to PCU 60, and PCU 60 is connected to battery 70.

Exhaust gas purifying device 17 is connected to engine 10. Exhaust gas purifying device 17 purifies exhaust stream discharged from engine 10 with use of a catalyst. The exhaust gas discharged from engine 10 is purified by exhaust gas purifying device 17 and discharged to outside of the vehicle. Air-fuel ratio sensor 18 is arranged between engine 10 and exhaust gas purifying device 17. Air-fuel ratio sensor 18 can detect an air-fuel ratio, which indicates a ratio of fuel and air contained in air-fuel mixture supplied to engine 10, based on a quantity of oxygen contained in the exhaust gas discharged from engine 10. The air-fuel ratio is a non-dimensional number obtained by dividing air mass of air-fuel mixture supplied to engine 10 by fuel mass.

Control device 100 includes a power management electronic control unit (hereinafter, referred to as "PM-ECU") 140, an engine electronic control unit (hereinafter, referred to as "engine ECU") 141, a motor electronic control unit (hereinafter, referred to as "motor ECU") 142, and a battery electronic control unit (hereinafter, referred to as "battery ECU") 143.

PM-ECU 140 is connected to engine ECU 141, motor ECU 142, and battery ECU 143 via a communication port not illustrated in the drawings. PM-ECU 140 performs communication of various control signals and data with each of engine ECU 141, motor ECU 142, and battery ECU 143.

Motor ECU 142 is connected to PCU 60, and controls driving of motor generators 20, 30. Battery ECU 143 calculates a residual capacity (hereinafter, referred to as "SOC (State Of Charge)") based on an integrated value of a charge/discharge current of battery 70.

Engine ECU 141 is connected to engine 10 and fuel supply device 15. Engine ECU 141 controls engine 10 and fuel supply device 15. Engine ECU 141 receives input of signals from various sensors detecting operational states of engine 10. Engine ECU 141 performs operation controls of engine 10 such as a fuel injection control, an ignition control, and an adjustment control of intake air amount based on signals input from various sensors.

Moreover, engine ECU 141 controls fuel supply device 15 to control a fuel pressure which is a pressure applied to fuel supplied to engine 10. Particularly, when engine ECU 141 controls fuel supply device 15 to reduce a fuel pressure, and a predetermined condition for determination of generation of vapor is satisfied, engine ECU 141 executes a fuel pressure limitation control that increases the fuel pressure to be greater than a fuel pressure lower limit set for suppressing generation of vapor. For example, in the air-fuel ratio control that sets the air-fuel ratio to be close to the target value, when the correction amount in the direction of lowering the air-fuel ratio is greater than or equal to a predetermined amount, engine ECU 141 determines that the predetermined condition is satisfied. Moreover, engine ECU 141 has a function to measure an elapsed time from starting the fuel pressure limitation control. Details of the fuel pressure control performed by engine ECU 141 will be described later.

<Configuration of Engine and Fuel Supply Device>

Figure 2:
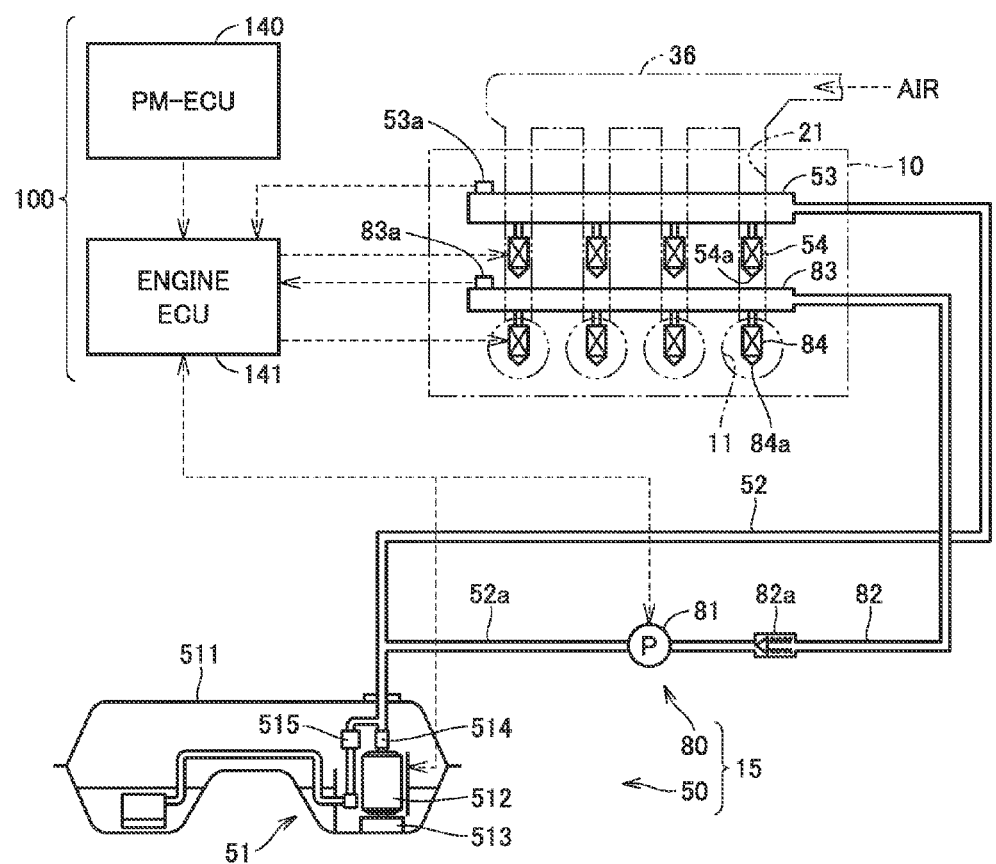
FIG. 2 represents a configuration of an engine and a fuel supply device with regard to a fuel supply.

FIG. 2 represents a configuration of engine 10 and fuel supply device 15 with regard to a fuel supply. Referring to FIG. 2, engine 10 includes an intake manifold 36, an intake port 21, and four cylinders 11 provided in cylinder blocks. Intake air AIR flows from an intake port pipe into each cylinder 11 through intake manifold 36 and intake port 21 when a piston, which is not illustrated, in cylinder 11 is lowered.

Fuel supply device 15 includes a low pressure fuel supply mechanism 50 and a high pressure fuel supply mechanism 80. Fuel supply device 15 supplies fuel to engine 10. Low pressure fuel supply mechanism 50 includes a fuel pressure-feed unit 51, a low pressure fuel piping 52, a low pressure delivery pipe 53, a low pressure fuel pressure sensor 53a, and a port injection valve 54.

Fuel pressure-feed unit 51 includes a fuel tank 511, a feed pump 512, a suction filter 513, a fuel filter 514, and a relief valve 515.

Fuel tank 511 stores fuel consumed in engine 10, such as gasoline. Suction filter 513 prevents intake of foreign matters. Fuel filter 514 removes foreign matters in discharged fuel. Relief valve 515 opens when the pressure of fuel discharged from feed pump 512 reaches an upper limit pressure, and it maintains a valve closed state while the pressure of fuel does not reach the upper limit pressure.

Low pressure fuel piping 52 connects from fuel pressure-feed unit 51 to low pressure delivery pipe 53. Low pressure delivery pipe 53 is connected, at one end side of cylinder 11 in a serial arrangement direction, to low pressure fuel piping 52. Low pressure delivery pipe 53 stores fuel which is pressurized by feed pump 512 to be discharged from port injection valve 54. Port injection valve 54 is connected to low pressure delivery pipe 53. Low pressure fuel pressure sensor 53a for detecting an internal fuel pressure is mounted to low pressure delivery pipe 53.

Port injection valve 54 is a port injection injector which exposes a nozzle hole portion 54a to intake port 21 corresponding to each cylinder 11. When port injection valve 54 is opened, the pressurized fuel in low pressure delivery pipe 53 is injected from nozzle hole portion 54a of port injection valve 54 into intake port 21.

Feed pump 512 is driven or stopped based on command signals received from engine ECU 141. Feed pump 512 can pump up fuel from fuel tank 511, pressurize the fuel to a pressure within a certain variable range which is less than, for example, 1 MPa (megapascals), and discharge the same. Further, feed pump 512 can change a discharge amount per unit time and a discharge pressure in accordance with a control of engine ECU 141. In other words, engine ECU 141 can control the fuel pressure by driving feed pump 512.

On the other hand, high pressure fuel supply mechanism 80 includes a high pressure pump 81, a check valve 82a, a high pressure fuel piping 82, a high pressure delivery pipe 83, a high pressure fuel pressure sensor 83a, and a cylinder injection valve 84.

Cylinder injection valve 84 is a cylinder injection injector which exposes a nozzle hole portion 84a to a combustion chamber of each cylinder 11. When cylinder injection valve 84 is opened, the pressurized fuel in high pressure delivery pipe 83 is injected from nozzle hole portion 84a of cylinder injection valve 84 into cylinder 11.

High pressure pump 81 is provided between low pressure fuel piping 52 and high pressure fuel piping 82. Check valve 82a prevents a reversed flow of fuel from high pressure fuel piping 82 to high pressure pump 81.

High pressure delivery pipe 83 is connected, at one end side of cylinder 11 in the serial arrangement direction, to high pressure fuel piping 82. Cylinder injection valve 84 is connected to high pressure delivery pipe 83. A high pressure fuel pressure sensor 83a for detecting an internal fuel pressure is mounted to high pressure delivery pipe 83.

Engine ECU 141 is configured to include a CPU (Central Processing Unit), a ROM (Read Only Memory), a RAM (Random Access Memory), an input interface circuit, an output interface circuit, and the like. Engine ECU 141 receives an engine starting/stopping command from PM-ECU 140 to control engine 10 and fuel supply device 15.

Specifically, engine ECU 141 calculates fuel injection amount required for each combustion based on an accelerator opening, an intake air amount, an engine rotational speed, and the like. Based on the calculated fuel injection amount, ECU 141 timely outputs injection command signals and the like to port injection valve 54 and cylinder injection valve 84.

Moreover, engine ECU 141 drives feed pump 512 to control fuel pressures in low pressure fuel piping 52 and low pressure delivery pipe 53. As to the fuel pressure control in low pressure fuel piping 52 and low pressure delivery pipe 53, it can be contemplated to gradually lower the fuel pressure in accordance with an operation state of engine 10. However, when the fuel pressure is lowered, vapor may be generated depending on the temperature of fuel in low pressure fuel piping 52 and low pressure delivery pipe 53. When vapor is generated, the amount of fuel injected to engine 10 becomes insufficient as compared to the target value. On the other hand, in order not to lower the fuel pressure, it can be contemplated to maintain a high target fuel pressure regardless of the operation state of engine 10. However, it would be necessary to continuously supply great electric power to feed pump 512 to maintain the high target fuel pressure, thus it is not preferable in view of fuel consumption.

Therefore, in hybrid vehicle 1 in accordance with this first embodiment, when feed pump 512 is driven to lower the fuel pressure, and it is determined that vapor is generated in low pressure fuel piping 52, engine ECU 141 executes the fuel pressure limitation control that increases the fuel pressure at the time point of the determination.

Accordingly, with this hybrid vehicle 1, when it is determined that vapor is generated, the fuel pressure is increased to be higher than the fuel pressure limit set to suppress generation of vapor, so that generation of vapor can be suppressed. Moreover, when vapor is not generated, lowering of the fuel pressure can be continued. Therefore, according to this hybrid vehicle 1, consumption of energy for driving the pump can be reduced, so that deterioration in the fuel consumption can be prevented.

In this first embodiment, the predetermined condition for determination of generation of vapor in low pressure fuel piping 52 is satisfied when the correction amount in the direction of lowering the air-fuel ratio is greater than or equal to a predetermined amount in the air-fuel ratio control for controlling the air-fuel ratio to be the target value. Hereinafter, the air-fuel ratio control in the first embodiment will be described first, and then the fuel pressure control will be described next.

<Air-Fuel Ratio Control>

Figure 3:
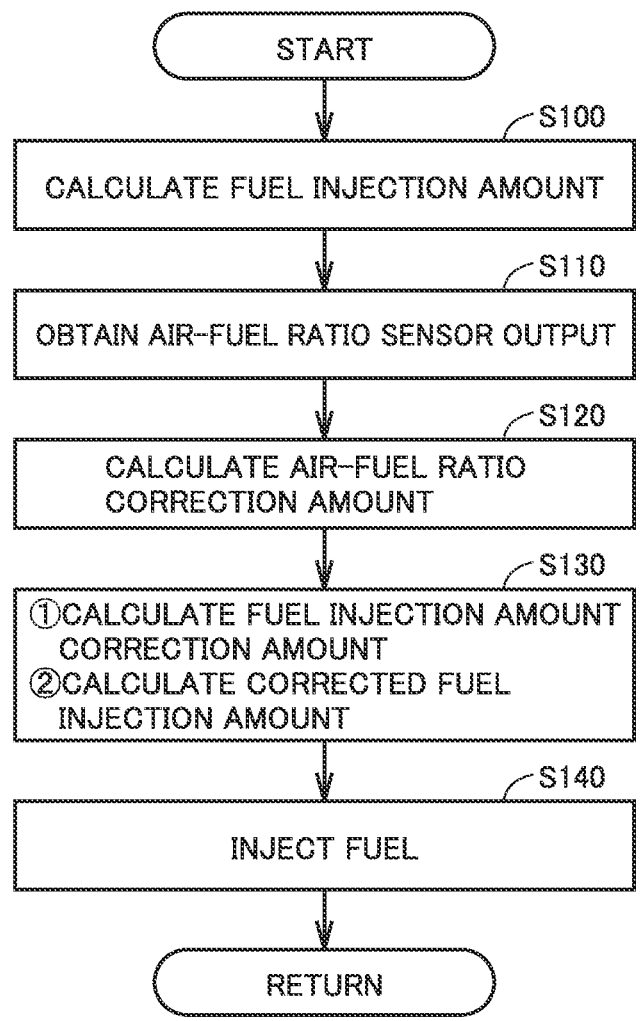
FIG. 3 is a flowchart representing an air-fuel ratio control.

FIG. 3 is a flowchart representing the air-fuel ratio control. The air-fuel ratio control is a control that controls the air-fuel ratio to be close to the target value. The processing shown in this flowchart is executed repeatedly during operation of engine 10.

Referring to FIG. 3, during operation of engine 10, engine ECU 141 calculates a fuel injection amount based on an accelerator opening, an intake air amount, an engine rotation speed, and the like (step S100). When the fuel injection amount is calculated, engine ECU 141 obtains output of air-fuel ratio sensor 18 (step S110). When the output of air-fuel ratio sensor 18 is obtained, engine ECU 141 calculates an air-fuel ratio correction amount for correcting the air-fuel ratio (step S120). For example, the air-fuel ratio correction amount is a correction amount of allowing the air-fuel ratio to be close to the target value, and it is calculated based on the output of air-fuel ratio sensor 18 and the target value. Information related to the target value of the air-fuel ratio is stored in a memory, which is not illustrated, in engine ECU 141.

When the air-fuel ratio correction amount is calculated, engine ECU 141 calculates a fuel injection correction amount for correcting the fuel injection amount calculated in step S100 based on the calculated air-fuel ratio correction amount. Herein, the fuel injection correction amount is a correction amount for allowing the air-fuel ratio to be close to the target value by correcting the fuel injection amount. Moreover, engine ECU 141 calculates a fuel injection amount after correction based on the fuel injection amount before correction and the fuel injection correction amount (step S130).

When the fuel injection amount after correction is calculated, engine ECU 141 controls engine 10 to inject fuel with the fuel injection amount after correction (step S140). Engine ECU 141 repeats the processing of the flowchart shown in FIG. 3 until engine 10 is stopped.

<Fuel Pressure Control>

Figure 4:
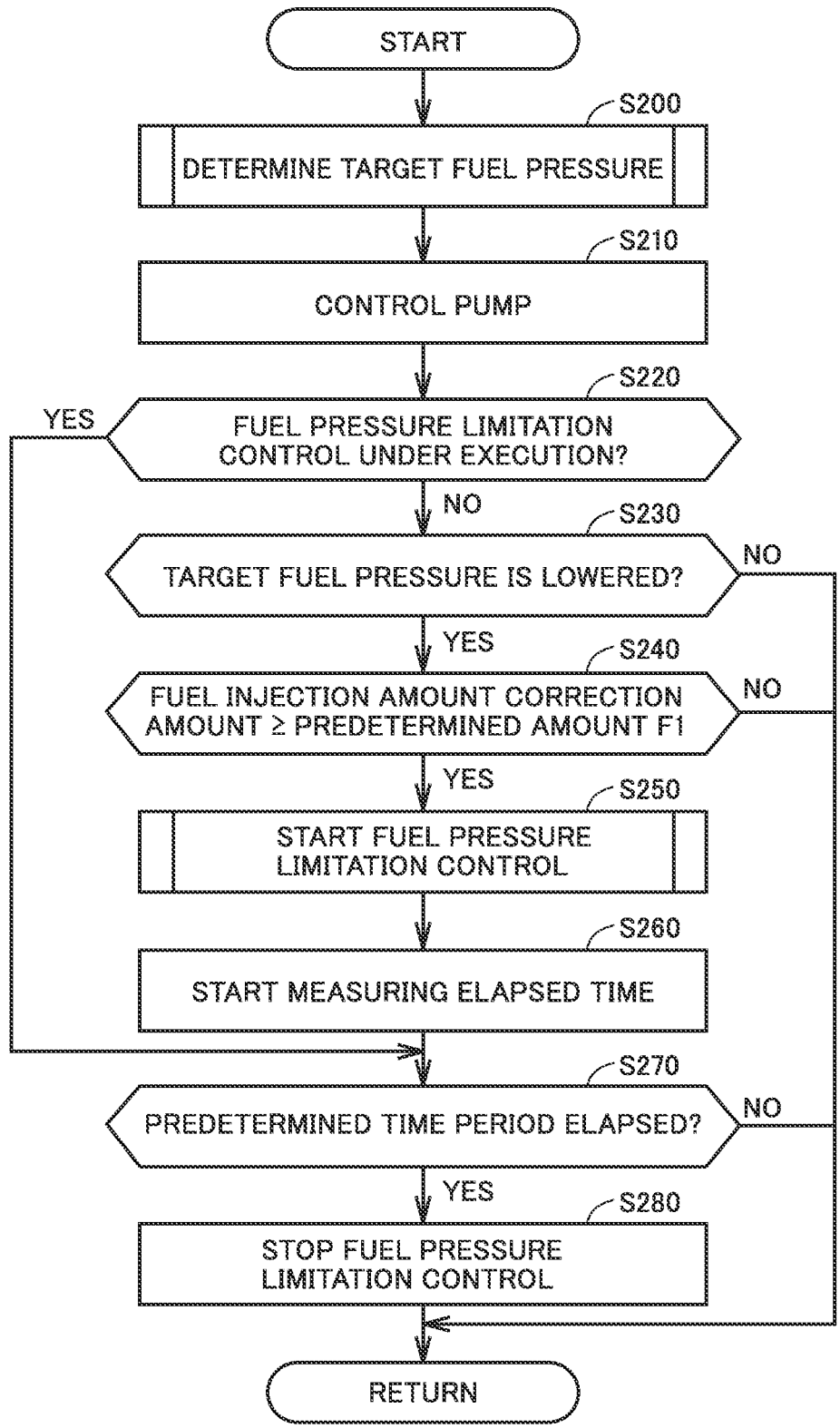
FIG. 4 is a flowchart representing a fuel pressure control in a low pressure fuel supply mechanism.

FIG. 4 is a flowchart representing the fuel pressure control in low pressure fuel supply mechanism 50. The processing shown in this flowchart is executed repeatedly during operation of engine 10. Moreover, the processing shown in this flowchart is executed in parallel with the air-fuel ratio correction processing shown in FIG. 3.

Referring to FIG. 4, when engine 10 is activated, engine ECU 141 determines a target fuel pressure, which is a target value of the fuel pressure in low pressure fuel piping 52 and low pressure delivery pipe 53, based on an accelerator opening, an intake air amount, an engine rotation speed, and the like (step S200). A specific method for determining the target fuel pressure will be described later. When the target fuel pressure is determined, engine ECU 141 controls feed pump 512 so as to set the fuel pressure in low pressure fuel piping 52 and low pressure delivery pipe 53 to be the target fuel pressure (step S210).

When feed pump 512 is controlled, engine ECU 141 determines whether or not the fuel pressure limitation control is under execution (step S220). The fuel pressure limitation control is a control that controls the fuel pressure to be greater than a lower limit guard which is set to suppress generation of vapor in low pressure fuel piping 52. When it is determined that vapor is generated, the fuel pressure is controlled such that the fuel pressure becomes greater than the lower limit guard, so that generation of vapor can be suppressed. When the fuel pressure limitation control is under execution, the fuel pressure limitation control is continued until a predetermined time period elapses from starting of the fuel pressure limitation control. When it is determined that vapor is generated, it is contemplated that such a situation continues for a predetermined time period. Therefore, engine ECU 141 does not determine whether or not vapor is generated until a predetermined time period elapses. Accordingly, the throughput of engine ECU 141 is reduced. Moreover, engine ECU 141 can lower the fuel pressure if it is in the situation where vapor is not generated even with lowering of the fuel pressure after the elapse of the predetermined time period. Consequently, waste can be reduced in view of the fuel consumption. Thus, in order to determine the necessity of deciding whether to start the fuel pressure limitation control, it is determined in step S220 whether or not the fuel pressure limitation control is already under execution.

When it is determined that the fuel pressure limitation control is under execution (YES in step S220), the processing proceeds to step S270. On the other hand, when it is determined that the fuel pressure limitation control is not under execution (NO in step S220), engine ECU 141 determined whether or not the target fuel pressure is lowered as compared with the previously calculated target fuel pressure (step S230). It should be noted that, when this processing of step S230 is executed for the first time after activation of engine 10, it is determined that the target fuel pressure is not lowered.

When it is determined that the target fuel pressure is not lowered as compared with the previously calculated target fuel pressure (NO in step S230), the processing of the flowchart shown in FIG. 4 is started again. On the other hand, when it is determined that the target fuel pressure is lowered as compared with the previously calculated target fuel pressure (YES in step S230), engine ECU 141 determines whether or not the fuel injection correction amount calculated for the air-fuel ratio control is greater than or equal to a predetermined amount F1 (step S240). If vapor is generated in low pressure fuel piping 52 or in low pressure delivery pipe 53, there is a possibility that the injection amount of fuel is reduced. In such a case, the air-fuel ratio becomes high. In this hybrid vehicle 1, the air-fuel ratio control that allows the air-fuel ratio to be close to the target value is executed. When the air-fuel ratio becomes high, the fuel injection correction amount is set so as to increase the fuel injection amount. In other words, when the fuel injection amount is greater than or equal to a predetermined amount, it can be determined that vapor is generated.

When it is determined that the fuel injection correction amount is less than predetermined amount F1 (NO in step S240), the processing of the flowchart shown in FIG. 4 is started again. On the other hand, when it is determined that the fuel injection correction amount is greater than or equal to predetermined amount F1 (YES in step S240), engine ECU 141 starts the fuel pressure limitation control (step S250).

When torque of engine 10 is constant, and the fuel injection correction amount is greater than or equal to a predetermined amount, it can be determined that vapor is generated in engine 10. In other words, engine ECU 141 starts the fuel pressure limitation control when it determines that vapor is generated in engine 10. When the fuel pressure limitation control is started, engine ECU 141 controls the target fuel pressure such that the target fuel pressure becomes greater than the lower limit guard when controlling the target fuel pressure in the next time. Here, a magnitude of the fuel pressure at the lower limit guard is set to be higher than the fuel pressure provided at the time when it is determined that the fuel injection correction amount is greater than or equal to predetermined amount F1. This is because, with the fuel pressure provided at the time when the fuel injection correction amount reaches predetermined amount F1, it can be determined that vapor is already generated, thus there is a possibility that generation of vapor cannot be suppressed even if the fuel pressure provided at the time when the fuel injection correction amount reaches predetermined amount F1 is set to be the fuel pressure of the lower limit guard. By setting the fuel pressure which is higher than the fuel pressure provided when it is determined that the vapor is generated to be the fuel pressure of the lower limit guard, generation of vapor can be suppressed more assuredly in this hybrid vehicle 1. The set value of the lower limit guard is stored in an internal memory which is not shown. A specific method for setting the lower limit guard at the time of starting the fuel pressure limitation control will be described later.

When the fuel pressure limitation control is started, engine ECU 141 starts measurement of time elapsed from starting of the fuel pressure limitation control (step S260). When it is determined in step S220 that the fuel pressure limitation control is under execution, or when measurement of time is started in step S260, engine ECU 141 can determine whether or not a predetermined time period has elapsed from starting the fuel pressure limitation control (step S270). Herein, the predetermined time period is a time period during which, when a predetermined condition for determination that vapor is generated is once satisfied, the predetermined condition is likely to be satisfied continuously, and it is set in advance with an experiment.

When it is determined that the predetermined time period has not elapsed (NO in step S270), the processing of the flowchart shown in FIG. 4 is started again. On the other hand, when it is determined that the predetermined time period has elapsed (YES in step S270), engine ECU 141 stops the fuel pressure limitation control (step S280). In other words, when the fuel pressure limitation control is once started, engine ECU 141 controls the target fuel pressure based on the lower limit guard until the predetermined time period elapses. On the other hand, when the predetermined time period has elapsed, engine ECU 141 once refrains from performing the fuel pressure limitation control. During operation of engine 10, engine ECU 141 repeats the processing of this flowchart.

Figure 5:
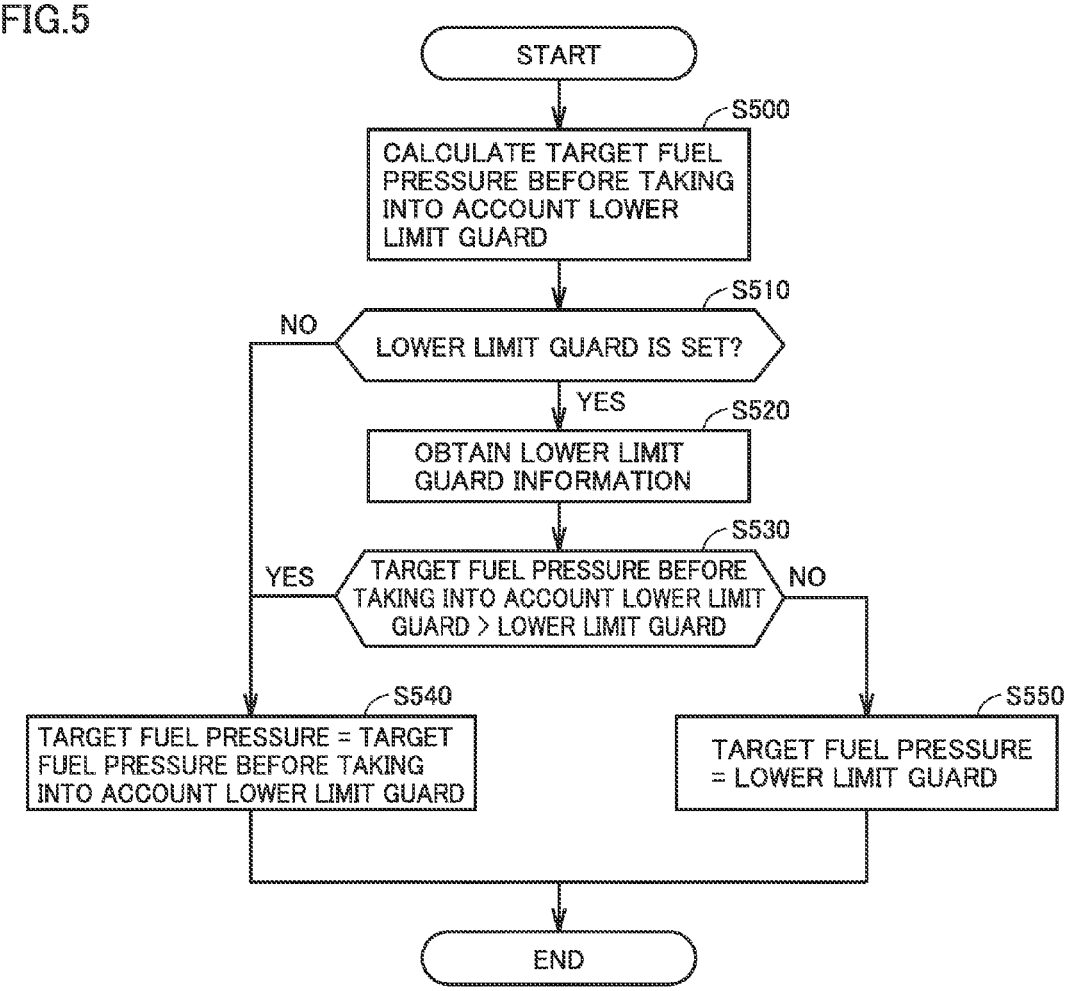
FIG. 5 is a flowchart for illustrating a method for determining a target fuel pressure.

FIG. 5 is a flowchart for illustrating a method for determining the target fuel pressure. The processing shown in this flowchart is executed in step S200 of the flowchart shown in FIG. 4. Referring to FIG. 5, engine ECU 141 calculates the target fuel pressure which is provided before the lower limit guard is taken into account (step S500). Specifically, engine ECU 141 calculates the target fuel pressure which is provided before the lower limit guard is taken into account based on an accelerator opening, an intake air amount, an engine rotation speed, and the like.

When the target fuel pressure which is provided before the lower limit guard is taken into account is calculated, engine ECU 141 determines whether or not the fuel pressure limitation control is already started and the lower limit guard is set (step S510). When it is determined that the lower limit guard is not set, the processing proceeds to step S540. On the other hand, when it is determined that the lower limit guard is set, engine ECU 141 reads out information indicating a value of the lower limit guard stored in an internal memory which is not shown (step S520).

When the information indicating a value of the lower limit guard is read out, engine ECU 141 determines whether or not the target fuel pressure, which is provided before the lower limit guard is taken into account and calculated in step S500, is greater than the lower limit guard (step S530). When it is determined that the target fuel pressure provided before the lower limit guard is taken into account is greater than the lower limit guard (YES in step S530), or when it is determined in step S510 that the lower limit guard is not set (NO in step S510), engine ECU 141 sets the target fuel pressure, which is provided before the lower limit guard is taken into account, as the target fuel pressure (step S540).

On the other hand, when it is determined that the target fuel pressure provided before the lower limit guard is taken into account is less than or equal to the lower limit guard (NO in step S530), engine ECU 141 sets the value of the lower limit guard as the target fuel pressure (step S550).

As described, when the fuel pressure limitation control is not started, the target fuel pressure is set without being limited by the lower limit guard. On the other hand, during execution of the fuel pressure limitation control, the target fuel pressure is controlled so as to be always greater than the lower limit guard. In other words, the fuel pressure limitation control executed by performing the lower limit guard control that controls the target fuel pressure such that the target fuel pressure is always greater than a predetermined value (lower limit guard).

Figure 6:
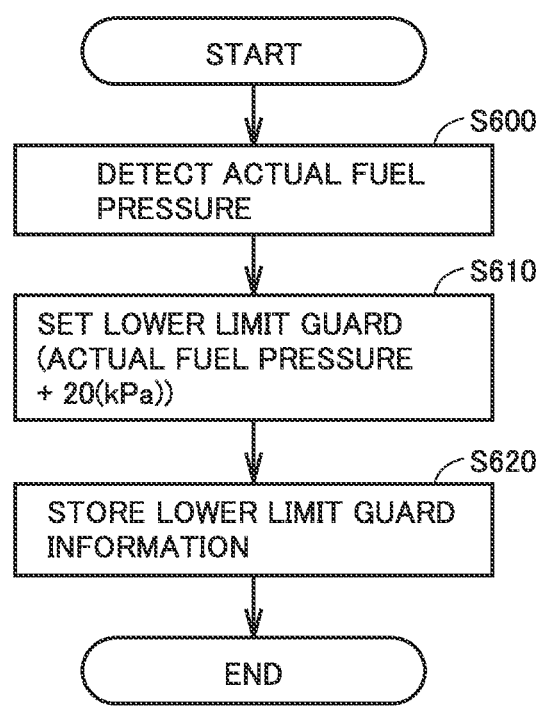
FIG. 6 is a flowchart for illustrating a method for setting a lower limit guard.

FIG. 6 is a flowchart for illustrating a method for setting a lower limit guard at the time of starting the fuel pressure limitation control. The processing shown in this flowchart is executed in step S250 of the flowchart shown in FIG. 4. Referring to FIG. 6, engine ECU 141 obtains information related to an actual fuel pressure from low pressure fuel pressure sensor 53a (step S600). When the information related to the actual fuel pressure is obtained, engine ECU 141 calculates a value of the lower limit guard (step S610). The lower limit guard is a value which is obtained by adding a predetermined pressure (for example, 20 kPa) to an actual fuel pressure.

When the lower limit guard is added, engine ECU 141 stores the information related to the calculated lower limit guard in an internal memory which is not shown (step S620).

As described, a fuel pressure, which is higher than an actual fuel pressure provided at the time when the predetermined condition for determining that vapor is generated is satisfied, is set for the lower limit guard. Accordingly, in this hybrid vehicle 1, generation of vapor can be more assuredly suppressed.

Figure 7:
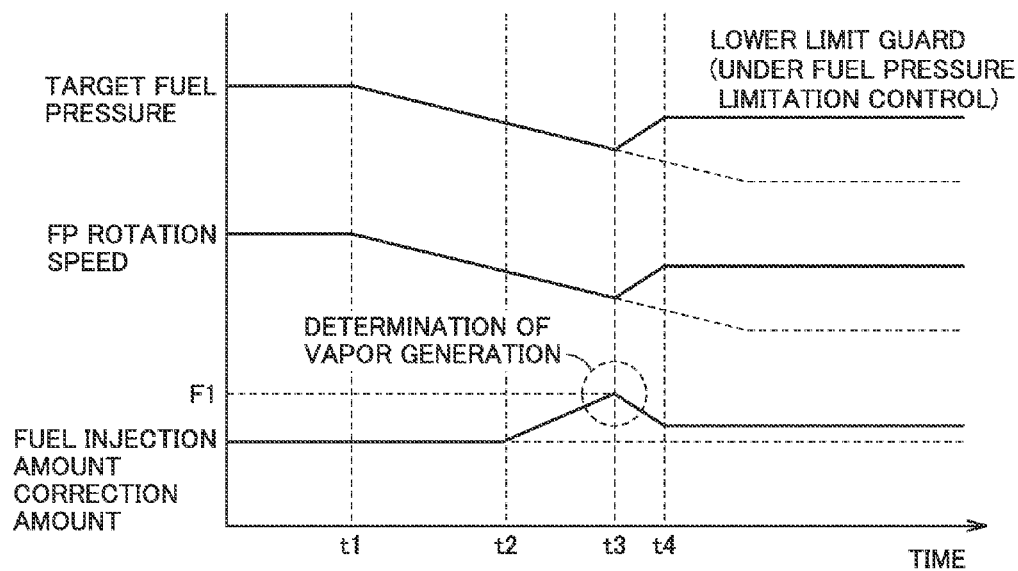
FIG. 7 is a timing chart representing a relationship between a target fuel pressure, a pump rotation frequency, and a fuel injection correction amount.

FIG. 7 is a timing chart representing a relationship between a target fuel pressure, a rotation speed of feed pump 512, and a fuel injection correction amount. Referring to FIG. 7, the horizontal axis denotes time. The vertical axis represents, from the upper side, transition of a target fuel pressure, transition of a rotation speed of feed pump 512 (FP rotation speed), and transition of a fuel injection correction amount. In the transition of the target fuel pressure, the pressure is higher on the upper side than the lower side. In the transition of the rotation speed of feed pump 512, the rotation speed is higher on the upper side than the lower side. In the transition of the fuel injection correction amount, the correction amount and the target value of the fuel injection amount are greater on the upper side than the lower side. It should be noted that, during the period shown in FIG. 7, torque of engine 10 is constant.

At time t1, as the target fuel pressure starts lowering, the rotation speed of feed pump 512 is also lowered. At time t1, the fuel injection correction amount is constant. During the period from time t1 to time t2, the target fuel pressure and the rotation speed of feed pump 512 are continuously lowered. At time t2, fuel injection correction amount starts rising. During the period from time t2 to time t3, the target fuel pressure and the rotation speed of feed pump 512 are further lowered continuously.

During the period from time t2 to time t3, the fuel injection correction amount continuously rises, and then it reaches predetermined amount F1 at time t3. As the fuel injection correction amount reaches predetermined amount F1, engine ECU 141 sets the lower limit guard at time t3. Then, during the period from time t3 to time t4, the target fuel pressure rises to the lower limit guard, and the rotation speed of feed pump 512 also rises. Accordingly, during the period from time t3 to time t4, the fuel injection correction amount is lowered and suppressed to a constant level.

As described above, in hybrid vehicle 1 which is one example of a vehicle in accordance with this first embodiment, when feed pump 512 is driven so as to lower the fuel pressure, and the fuel injection correction amount is greater than or equal to predetermined amount F1, engine ECU 141 executes the fuel pressure limitation control that increases the fuel pressure to be greater than the lower limit guard which is set to suppress generation of vapor. On the other hand, when the fuel injection correction amount is less than predetermined amount F1, engine ECU 141 does not execute the fuel pressure limitation control.

Accordingly, with this hybrid vehicle 1, when the fuel injection correction amount is greater than or equal to predetermined amount F1, the fuel pressure is increased to be greater than the lower limit guard, so that generation of vapor can be suppressed. Moreover, when the fuel injection correction amount is less than predetermined amount F1, lowering of the fuel pressure can be continued. Accordingly, energy consumed by the pump driven to maintain the fuel pressure can be reduced, so that deterioration of the fuel consumption can be reduced.

Second Embodiment

In the first embodiment, the example of determining whether or not to execute the fuel pressure limitation control based on the fuel injection correction amount in the air-fuel ratio control is described. In the second embodiment, an example of determining whether or not to execute the fuel pressure limitation control based on an output state of actual torque with respect to target torque of engine 10 will be described.

<Fuel Pressure Control>

The configuration shown in FIG. 1 and FIG. 2 is the same in this second embodiment and in the first embodiment. Hybrid vehicle 1 which is one example of a vehicle in accordance with this second embodiment is different as compared to hybrid vehicle 1 which is one example of the vehicle in accordance with the first embodiment in the content of processing of the fuel pressure control in low pressure fuel supply mechanism 50. Herein, only the matters which are different from the first embodiment will be described.

Figure 8:
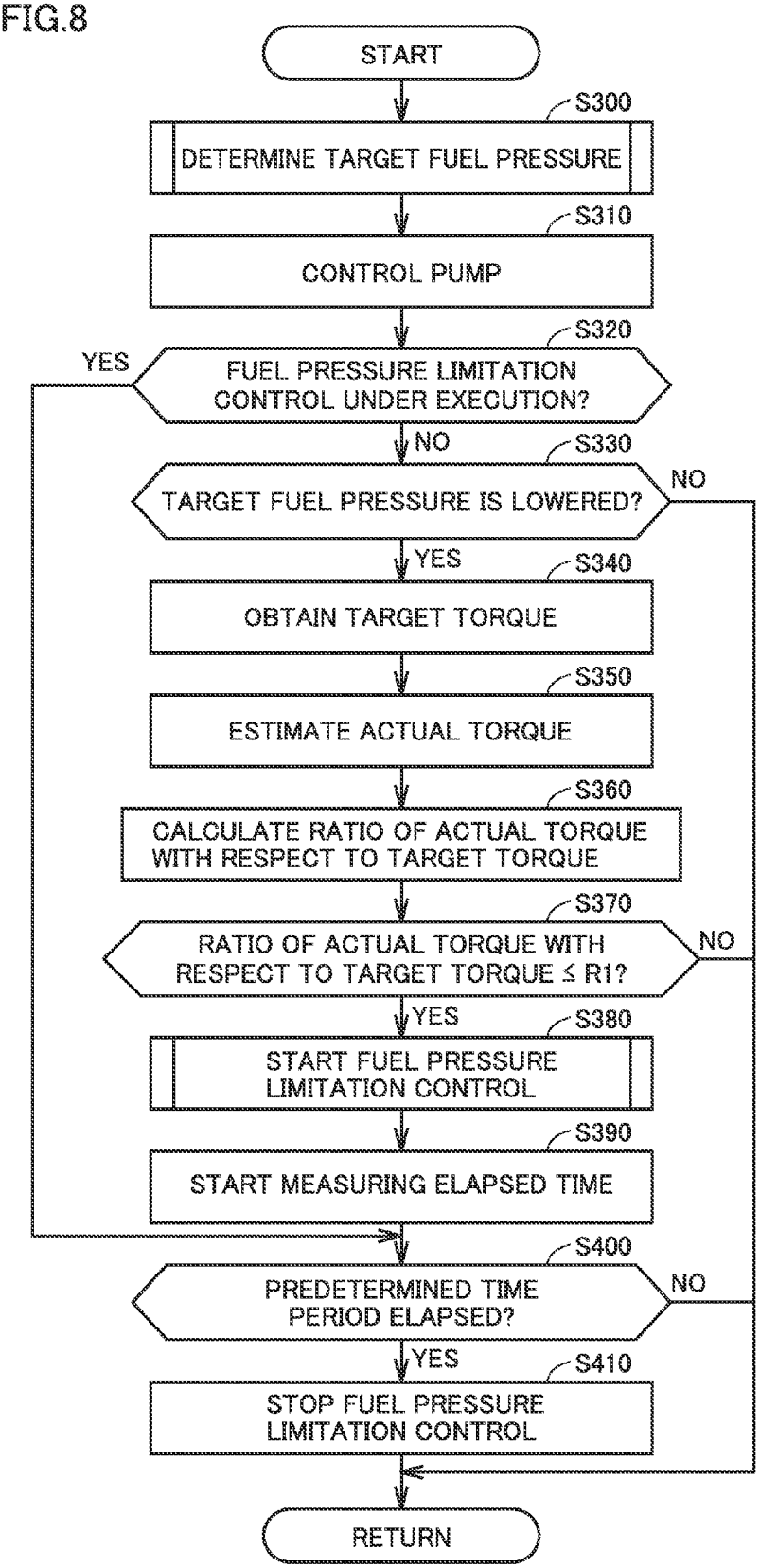
FIG. 8 is a flowchart representing a fuel pressure control in a low pressure fuel supply mechanism of the second embodiment.

FIG. 8 is a flowchart representing the fuel pressure control of low pressure fuel supply mechanism 50 in hybrid vehicle 1 which is one example of the vehicle in accordance with this second embodiment. Steps S300 to S330 in FIG. 8 are the same as steps S200 to S230 in FIG. 4. Moreover, steps S380 to S410 are the same as steps S250 to S280. Thus, in FIG. 8, description will be focused on steps S340 to S370.

Referring to FIG. 8, when it is determined in step S330 that the target fuel pressure is not lowered (NO in step S330), the processing of the flowchart shown in FIG. 8 is started again. On the other hand, when it is determined in step S330 that the target fuel pressure is lowered (YES in step S330), engine ECU 141 obtains a value of a target torque which is a target value of torque of engine 10 (step S340). Engine ECU 141 executes processing for a torque control in parallel with the processing of the flowchart shown in FIG. 8. Therefore, ECU 141 calculates a value of target torque for the torque control.

When the value of the target torque is obtained, engine ECU 141 estimates actual torque which is torque actually outputted by engine 10 (step S350). The actual torque is estimated with use of various known approaches. When the actual torque is estimated, engine ECU 141 calculates a ratio of the actual torque with respect to the target torque (step S360).

When the ratio of the actual torque with respect to the target torque is calculated, engine ECU 141 determines whether or not the ratio of the actual torque with respect to the target torque is less than or equal to a predetermined ratio R1 (step S370). When it is determined that the ratio of the actual torque with respect to the target torque is greater than predetermined ratio R1 (NO in step S370), the processing of the flowchart shown in FIG. 8 is started again. On the other hand, when it is determined that the ratio of the actual torque with respect to the target torque is less than or equal to predetermined ratio R1 (YES in step S370), engine ECU 141 starts the fuel pressure limitation control (step S380).

When vapor is generated in low pressure fuel piping 52 or in low pressure delivery pipe 53, there is a possibility that the injection amount of fuel is reduced. In such a case, torque outputted by engine 10 is lowered. In this case, the actual torque becomes insufficient with respect to the target torque. In other words, when the ratio of the actual torque with respect to the target torque is less than or equal to a predetermined value, it can be determined that vapor is generated. Thus, in the case described above, by starting the fuel pressure limitation control, engine ECU 141 can suppress generation of vapor when it determines that vapor is generated. Moreover, since this engine ECU 141 can continue lowering of the fuel pressure when vapor is not generated, deterioration of fuel consumption can be prevented.

Figure 9:
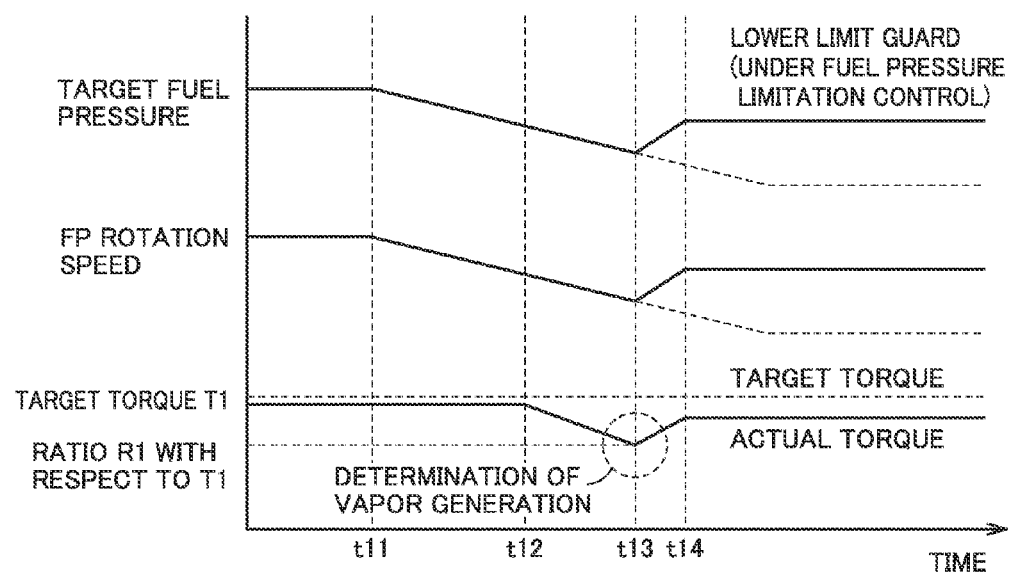
FIG. 9 is a timing chart representing a relationship between a target fuel pressure, a pump rotation frequency, and actual torque.

FIG. 9 is a timing chart representing a relationship between a target fuel pressure, a rotation speed of feed pump 512, and a ratio of actual torque with respect to target torque. Referring to FIG. 9, the horizontal axis denotes time. The vertical axis denotes, from the upper side, transition of the target fuel pressure, transition of the rotation speed of feed pump 512 (FP rotation speed), and transition of a ratio of actual torque with respect to target torque T1. In the transition of the ratio of actual torque with respect to target torque T1, the ratio is higher on the upper side than the lower side.

At time t11, the rotation speed of feed pump 512 is lowered as the target fuel pressure starts lowering. At time t11, the ratio of actual torque with respect to target torque is 1. During the period from time t11 to time t12, the target fuel pressure and the rotation speed of feed pump 512 are lowered continuously. At time t12, the ratio of actual torque with respect to target torque starts lowering. During the period from time t12 to time t13, the target fuel pressure and the rotation speed of feed pump 512 are further lowered continuously.

During the period from time t12 to time t13, the ratio of actual torque with respect to target torque is lowered continuously and reaches predetermined ratio R1 at time t13. As the ratio of actual torque with respect to target torque reaches predetermined ratio R1, engine ECU 141 starts the fuel pressure limitation control at time t13. Then, during the period from time t13 to time t14, the target fuel pressure rises to the lower limit guard, and the rotation speed of feed pump 512 also rises. Accordingly, during the period from time t13 to time t14, the ratio of actual torque with respect to target torque rises, and a constant level is maintained.

Third Embodiment

In the first and second embodiments, examples are described in which the lower limit guard of the fuel pressure is set and then the fuel pressure control is executed when it is determined that vapor is generated in low pressure fuel piping 52. In the third embodiment, an example will be described in which, when it is determined that vapor is generated in low pressure fuel piping 52, the fuel pressure control that raises the target fuel pressure without setting the lower limit guard of the fuel pressure.

<Fuel Pressure Control>

The configuration shown in FIGS. 1 and 2 are the same in the third embodiment and the first and second embodiments. Hybrid vehicle 1 as one example of the vehicle in accordance with this third embodiment is different as compared to the first and second embodiments in the contents of processing of the fuel pressure control in low pressure fuel supply mechanism 50. Herein, only the matters which are different from the first and second embodiments will be described.

FIG. 10 is a flowchart representing a fuel pressure control of low pressure fuel supply mechanism 50 in hybrid vehicle 1 as one example of the vehicle in accordance with this third embodiment. The processing shown in the flowchart of FIG. 10 is executed repeatedly during operation of engine 10. Referring to FIG. 10, when engine 10 is activated, engine ECU 141 calculates a target fuel pressure which is a target value of the fuel pressure in low pressure fuel piping 52 and in low pressure delivery pipe 53 based on an accelerator opening, an intake air amount, an engine rotation speed, and the like (step S700). In this third embodiment, since the lower limit guard is not set unlike first and second embodiments, the lower limit guard is not taken into account in this step S700.

When the target fuel pressure is calculated, engine ECU 141 controls feed pump 512 such that the fuel pressure in low pressure fuel piping 52 and low pressure delivery pipe 53 is set to be the target fuel pressure (step S710). A certain amount of time is required until the fuel pressure reaches the target fuel pressure after starting the control of feed pump 512. The processing in step S710 is executed with a certain amount of time. When feed pump 512 is controlled, engine ECU 141 determines whether or not the target fuel pressure is lowered as compared to the target fuel pressure calculated for previous control of feed pump 512 (step S720). It should be noted that, when the processing of step S720 is executed for the first time after activation of engine 10, it is determined that the target fuel pressure is not lowered.

When it is determined that the target fuel pressure is not lowered as compared to the previously calculated target fuel pressure (NO in step S720), the processing of the flowchart shown in FIG. 10 is started again. On the other hand, when it is determined that the target fuel pressure is lowered as compared to the previously calculated target fuel pressure (YES in step S720), engine ECU 141 determines whether or not the fuel injection correction amount calculated for the air-fuel ratio control is greater than or equal to predetermined amount F1 (step S730). When it is determined that the fuel injection correction amount is less than predetermined amount F1 (NO in step S730), the processing of the flowchart shown in FIG. 10 is started again. On the other hand, when it is determined that the fuel injection correction amount is greater than or equal to predetermined amount F1 (YES in step S730), engine ECU 141 calculates a target fuel pressure. Specifically, engine ECU 141 sets a value obtained by adding a predetermined pressure (P1) to the target fuel pressure calculated for the previous control of feed pump 512 to be a target fuel pressure (step S740). For example, when the previously calculated target fuel pressure is a fuel pressure to which predetermined pressure (P1) is already added (TP+P1), predetermined pressure (P1) is further added, and the target fuel pressure becomes TP+2*P1.

When the target fuel pressure having predetermined pressure (P1) added thereto is calculated, the processing proceeds to step S710, and engine ECU 141 controls feed pump 512 such that the fuel pressure in low pressure fuel piping 52 and low pressure delivery pipe 53 is again set to be the target fuel pressure.

As described above, in this third embodiment, when it is determined that vapor is generated in low pressure fuel piping 52, engine ECU 141 equally raises the target fuel pressure by a predetermined pressure without setting the lower limit guard of the fuel pressure. Accordingly, with this hybrid vehicle 1, when vapor is generated, the target fuel pressure is raised, so that generation of vapor can be suppressed.

Moreover, in this third embodiment, when generation of vapor is not suppressed even through the target fuel pressure is raised by a predetermined pressure, engine ECU 141 further raises the target fuel pressure, which has been raised by the predetermined pressure, by the predetermined pressure. As described above, according to this hybrid vehicle, generation of vapor can be suppressed more assuredly by gradually raising the target fuel pressure.

It should be noted that, in this third embodiment, when vapor is generated, the target fuel pressure is raised uniformly to the predetermined pressure (P1). However, it is not necessarily limited to such a configuration. For example, it may be configured to raise the target fuel pressure non-uniformly. For example, it may be configured such that the predetermined pressure to be raised may be greater as the fuel pressure at the time of generation of vapor is lower.

Moreover, in this third embodiment, generation of vapor is determined based on whether or not the fuel injection correction amount is greater than or equal to the predetermined amount, but it is not necessarily limited to this. For example, like the second embodiment, it may be configured such that generation of vapor is determined based on an output state of actual torque with respect to target torque of engine 10.

Other Embodiment

In the above, the first to third embodiments as embodiments of the present disclosure were described. However, the present disclosure can be applied to other various embodiments. Next, some of other various embodiments will be described.

In the first and third embodiments, when the fuel injection correction amount, which is calculated during the air-fuel ratio control, in the direction of lowering the air-fuel ratio is greater than or equal to predetermined amount F1, the predetermined condition for determining that vapor is generated is satisfied. However, it is not necessarily limited to such configuration. For example, when air-fuel ratio correction amount is the amount in the direction of lowering the air-fuel ratio, and it is greater than a predetermined amount, the predetermined condition may be satisfied. Moreover, for example, when the output of air-fuel ratio sensor 18 is greater than or equal to the target value by the amount greater than or equal to a predetermined amount, the predetermined condition may be satisfied.

Moreover, in the first and second embodiments, after the fuel pressure limitation control is once started, the fuel pressure limitation control is continued until the elapse of a predetermined time period regardless of whether or not the predetermined condition is satisfied continuously. However, it is not necessarily limited to such configuration. For example, it may be configured such that, even when a predetermined time period has not elapsed after starting the fuel pressure limitation control, the fuel pressure limitation control is stopped when the predetermined condition is not satisfied. Accordingly, the lower limit guard is set only in the case where the lower limit guard is required to be set.

Moreover, in the first and second embodiments, the lower limit guard of the fuel pressure is set to be a fuel pressure higher than the fuel pressure provided at the time when the predetermined condition for determining that the vapor is generated is satisfied, and the lower limit guard is not particularly changed until a predetermined time period elapses. However, it is not necessarily limited to such configuration. For example, it may be configured such that, when the lower limit guard of the fuel pressure is set once, and no change can be observed in the fuel injection correction amount in the first embodiment and a ratio of actual torque with respect to target torque in the second embodiment, the lower limit guard of the fuel pressure is gradually reset to a higher position. Accordingly, the position of the lower limit guard can be continuously changed until the fuel injection correction amount is reduced in the first embodiment, or until the ratio of actual torque with respect to target torque is raised in the second embodiment. Consequently, generation of vapor can be suppressed assuredly.

Moreover, in the first and second embodiments, engine ECU 141 measures a time period from the time of starting the fuel pressure limitation control. However, it is not necessarily limited to such configuration. For example, engine ECU 141 may measure the time period elapsed from the time at which the predetermined condition for determining that vapor is generated is satisfied. In short, it is all necessary that engine ECU 141 measures a time period elapsed from a specific time point determined due to the satisfaction of the predetermined condition.

Moreover, in the first and second embodiments, a magnitude of the fuel pressure at the lower limit guard is set to be higher than the fuel pressure provided when the fuel injection correction amount in the first embodiment is greater than or equal to predetermined amount F1, or when the ratio of the actual torque with respect to the target torque in the second embodiment is determined as being less than or equal to predetermined ratio R1. However, it is not necessarily limited to such configuration. For example, a magnitude of the fuel pressure at the lower limit guard may be lower than or equal to the fuel pressure provided at the time when the predetermining condition for determining that vapor is generated is satisfied. When the magnitude of the fuel pressure at the lower limit guard is lower than the fuel pressure provided at the time when the predetermined condition is satisfied, generation of vapor is likely to be continued. However, as compared to the case where the lower limit guard is not set, a speed of progress of vapor generation can be suppressed by setting the lower limit guard.

Moreover, in the second embodiment, in order to determine whether or not to start the fuel pressure limitation control, engine ECU 141 determines whether or not the ratio of the actual torque with respect to the target torque is less than or equal to a predetermined value. However, it is not necessarily limited to such configuration. For example, engine ECU 141 may determine whether or not to start the fuel pressure limitation control by determining whether or not a difference between the target torque and the actual torque is greater than or equal to the predetermined amount. In short, it is all necessary that it is configured such that the predetermined condition is satisfied when the actual torque is lowered with respect to the target torque by the amount greater than or equal to a predetermined amount.

Moreover, the first to third embodiments are described as separate embodiments. However, it is not necessarily limited to such configuration. For example, it may be configured to combine the first embodiment and the second embodiment. In other words, it may be configured such that whether or not to start the fuel pressure limitation control is determined based on the ratio of actual torque with respect to the target torque after determining whether to start the fuel pressure limitation control based on the fuel injection correction amount, or it may be configured such that whether to start the fuel pressure limitation control is determined based on the fuel injection correction amount after determining whether to start the fuel pressure limitation control based on the ratio of actual torque with respect to target torque. Accordingly, it can be determined whether or not to start the fuel pressure limitation control appropriately in view of both the fuel injection correction amount and a magnitude of actual torque with respect to target torque.

Moreover, in the first to third embodiments, hybrid vehicle 1 is shown as one example in accordance with embodiments of the present disclosure. However, it is not necessarily limited to such an example. For example, it can be applied also to a gasoline engine vehicle not including motor generators 20, 30. In short, it can be applied to any vehicle as long as it is a vehicle in which fuel is supplied to a fuel injection valve by applying a pressure to fuel.

It should be noted that, in the description above, engine 10 corresponds to one example of the "combustion engine" in the present disclosure, and feed pump 512 corresponds to one example of the "pump" in the present disclosure, and engine ECU 141 corresponds to one example of the "control device" in the present disclosure. Moreover, air-fuel ratio sensor 18 corresponds to one example of the "air-fuel ratio sensor" in the present disclosure. Moreover, the fuel pressure limitation control corresponds to one example of the "fuel pressure control" in the present disclosure.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A vehicle comprising:
    a combustion engine;
    a pump configured to supply fuel to a fuel injection valve of the combustion engine through fuel piping by applying a pressure to fuel;
    an electronic control unit configured to control a fuel pressure which is a pressure applied to fuel by driving the pump; and
    a fuel pressure sensor configured to detect the fuel pressure,
    when the pump is driven to lower the fuel pressure and it is determined that vapor is generated in the fuel piping, the electronic control unit executing a fuel pressure limitation control that increases the fuel pressure provided at the time of the determination, wherein
    the fuel pressure limitation control increases the fuel pressure by performing a lower limit guard control that controls the fuel pressure such that the fuel pressure always becomes greater than a predetermined value,
    the predetermined value is a value which is obtained by adding a predetermined pressure to an actual fuel pressure obtained by the fuel pressure sensor at the time when it is determined that the vapor is generated,
    the electronic control unit is configured to:
    stop the fuel pressure limitation control when an elapsed time from determination of generation of the vapor exceeds a predetermined time period; and
    maintain the predetermined value in the predetermined time period from starting of the fuel pressure limitation control.

2. The vehicle according to claim 1, wherein the electronic control unit executes an air-fuel ratio control for controlling an air-fuel ratio of air-fuel mixture supplied to the combustion engine to be a target value, and
    the electronic control unit determines the generation of the vapor when a correction amount in a direction of lowering the air-fuel ratio by the air-fuel ratio control is greater than or equal to a predetermined amount.

3. The vehicle according to claim 1 further comprising:
    an air-fuel ratio sensor configured to detect an air-fuel ratio of air-fuel mixture supplied to the combustion engine, wherein
    the electronic control unit determines the generation of the vapor when the air-fuel ratio detected by the air-fuel ratio sensor is greater than a target value of the air-fuel ratio by a predetermined amount or greater.

4. The vehicle according to claim 1, wherein the electronic control unit determines the generation of the vapor when actual torque outputted by the combustion engine is less than target torque of the combustion engine by a predetermined amount or greater.

* * * * *